Figure 1:
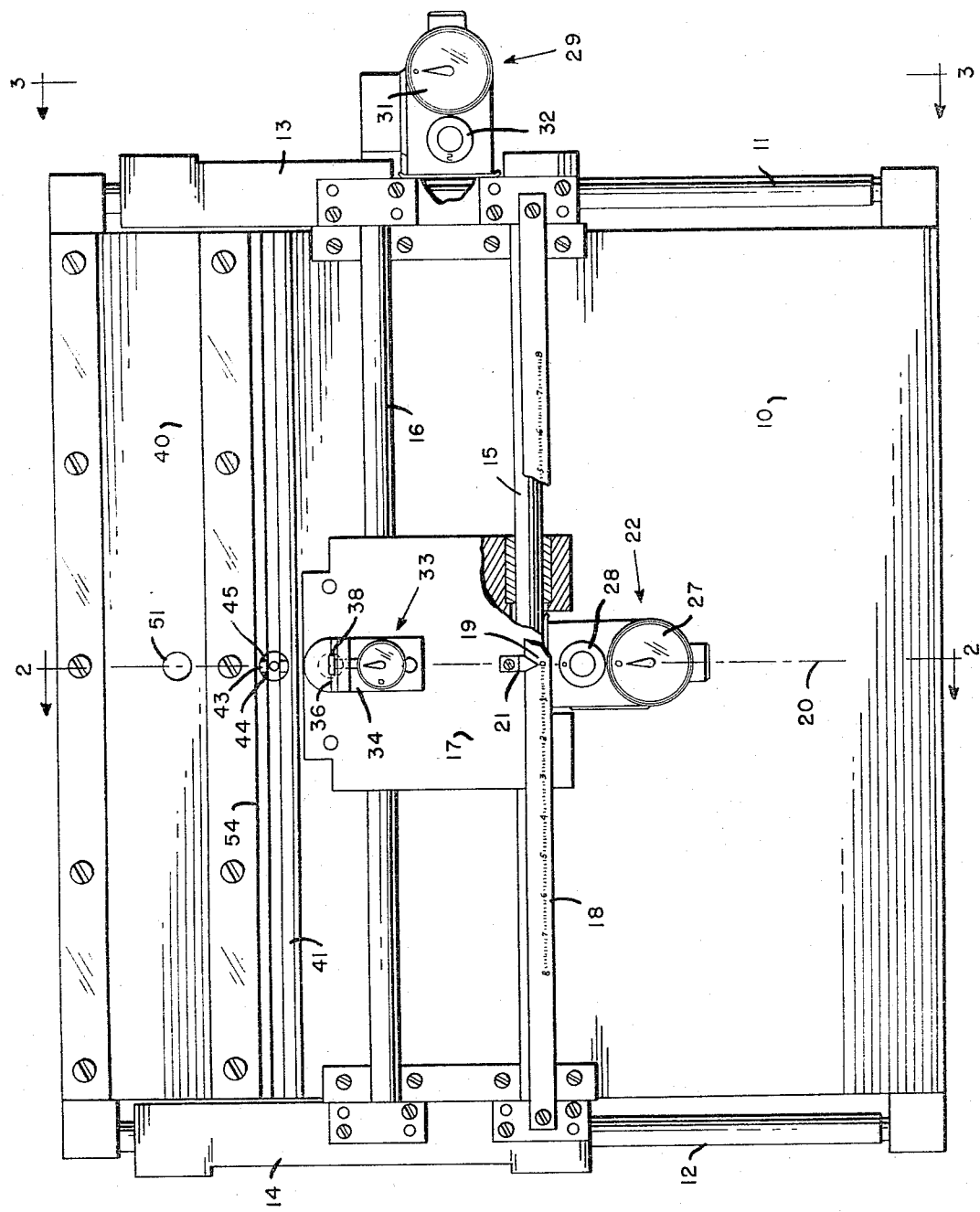

Dec. 20, 1966   M. W. WILTERDINK ETAL   3,292,267
PRESET TOOLING
Filed April 22, 1964   4 Sheets-Sheet 1

INVENTORS.
MEREDITH W. WILTERDINK
LEROY E. ALVEY
JESSE W. MENDENHALL
BY
ATTORNEY

Dec. 20, 1966 M. W. WILTERDINK ETAL 3,292,267
PRESET TOOLING

Filed April 22, 1964 4 Sheets-Sheet 2

INVENTORS.
MEREDITH W. WILTERDINK
LEROY E. ALVEY
JESSE W. MENDENHALL
BY
ATTORNEY.

INVENTORS.
MEREDITH W. WILTERDINK
LEROY E. ALVEY
JESSE W. MENDENHALL
BY
ATTORNEY.

INVENTORS.
MEREDITH W. WILTERDINK
LEROY E. ALVEY
JESSE W. MENDENHALL
BY Paul M. Gist
ATTORNEY.

United States Patent Office 3,292,267
Patented Dec. 20, 1966

3,292,267
PRESET TOOLING
Meredith W. Wilterdink, Easton, Leroy E. Alvey, Bridgeport, and Jesse W. Mendenhall, Fairfield, Conn., assignors to The Bullard Company, Bridgeport, Conn., a corporation of Connecticut
Filed Apr. 22, 1964, Ser. No. 361,784
7 Claims. (Cl. 33—185)

This invention relates to machine tools, and particularly to an improved method and apparatus for presetting cutting tools for machine tools.

In the advent of automation whereby the productivity of machine tools is increased far beyond that of manually operated machine tools, problems arise in reducing the time required to set up a machine tool for a given job.

Preset tooling is not broadly new, and its importance becomes particularly evident in the operation of multiple spindle lathes as well as tape-controlled machine tools.

The principal object of the present invention is to provide a system in which tools may be preset off the machine tool to which they are to be mounted, and may be constructed and arranged so that their mounting on the machine tool will consume a minimum of "down time."

Another object of the invention is to provide apparatus for supporting a tool block off the machine for the purpose of presetting it so that its cutting edge will be accurately located relative to a master bar, which latter is subsequently mounted on the machine for reference purposes.

In one aspect of the invention, a tool presetting fixture may comprise a base having parallel spaced ways along each side thereof for slidingly supporting brackets on each, which brackets in turn support spaced, parallel ways at right angles to those on the base.

In another aspect of the invention, a carriage may be mounted on the right angularly disposed ways and is, therefore, capable of universal movement in a plane including the top of the carriage.

In still another aspect of the invention, the base may include dovetail ways parallel with the second-mentioned ways for slidingly receiving a mating construction of tool blocks adapted to hold the cutting tools to be preset. The dovetail ways correspond exactly to ways on the machine tool to which the tool blocks, in their preset condition, are to be applied.

In a further aspect of the invention, the tool blocks may include a locating hole extending through them, and a master bar may be removably mounted on said base at a location so that the hole in the tool block lies directly over the bar. The master bar may include means that cooperates with locating means on the presetting fixture, and which locating means corresponds to identical locating means on the machine tool. Accordingly, sliding the tool block along the dovetail ways to a predetermined location permits passing a drill through the tool block hole and through the master bar for reference purposes, as will be described later.

In a still further aspect of the invention, a scale may be fixed to the brackets supporting the carriage ways, and it indicates inches on each side of a central zero which latter is on a line representing the centerline of the machine spindle. A pointer is fixed to the center of the carriage for cooperation with the scale.

In another aspect of the invention, a one-thousandth of an inch indicator may be attached to the carriage and it may include a rotatable operator that contacts one of the carriage ways so that movement of the carriage along the ways is indicated on the indicator dial. The indicator also may include another dial representing inches of movement of the carriage.

In still another aspect of the invention, a similar indicator may be attached to one of the brackets supporting the carriage ways, and its rotatable operator may engage the way along which said bracket slides for indicating movement of the carriage along said way.

In another aspect of the invention, there may be provided a zeroing block adapted to be mounted on the dovetail ways and located therealong such that one surface thereon lies exactly along the centerline of the base that corresponds to the spindle centerline, and another surface at right angles to the first lies along a line that is parallel to, and spaced an arbitrary distance (in this embodiment, 2") from a so-called "slide line" that is one of the edges of the dovetail ways and, therefore, corresponds to an identical line on the machine tool since the dovetail ways on the presetting fixture and on the machine tool are identical.

In still another aspect of the invention, a ten-thousandths of an inch indicator may be attached to a support that is pivotally mounted on the carriage such that the centerline of the base or spindle always lies within a plane surface on the support in all of its pivotal positions. The operating end of the indicator finger extends slightly beyond this plane surface so that the indicator will function accurately.

The above, other objects and novel features of the invention will become apparent from the following specification and accompanying drawings which are merely exemplary.

Figure 2:
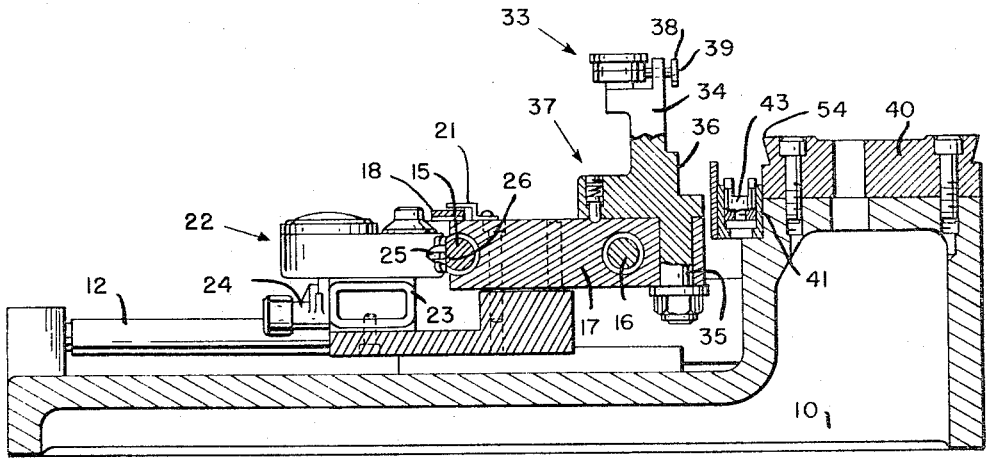
Figure 3:
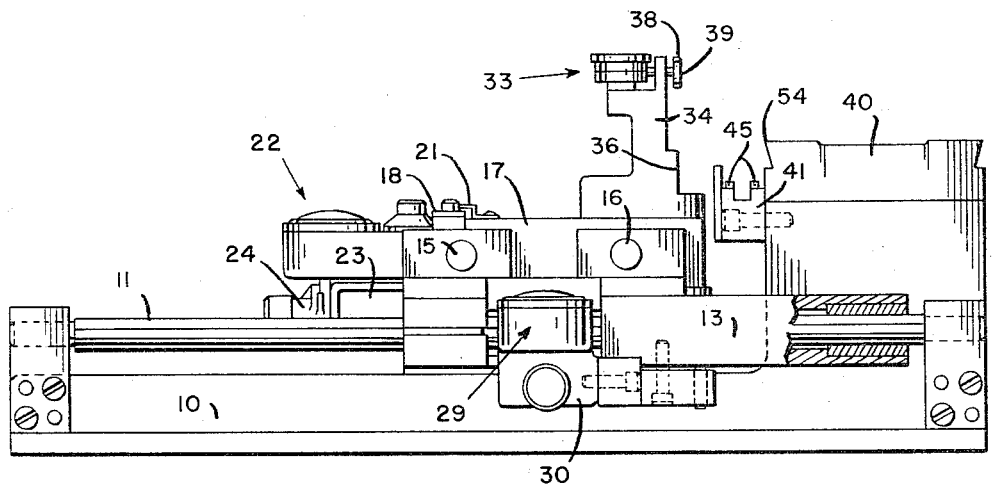
Figure 4:
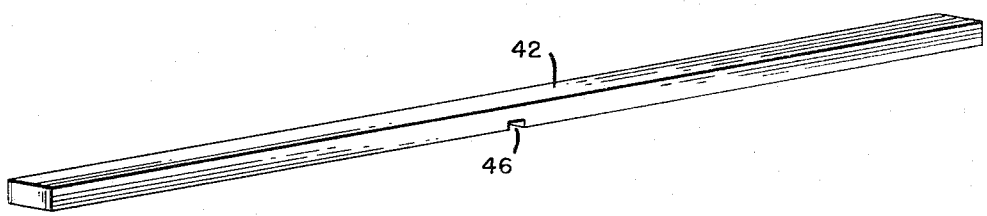
Figure 5:
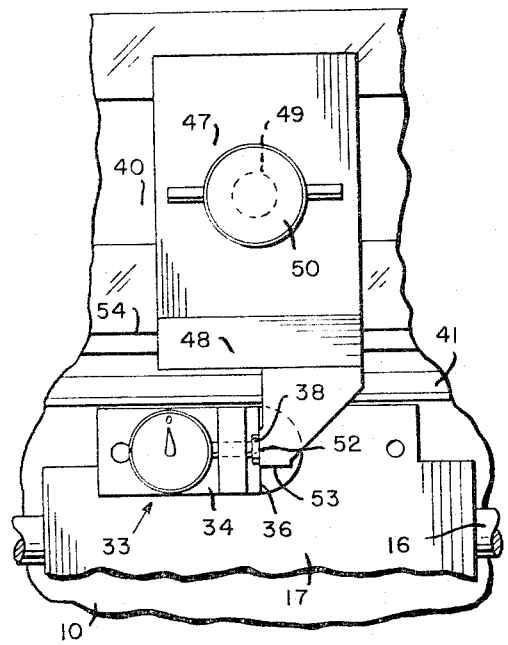
Figure 6:
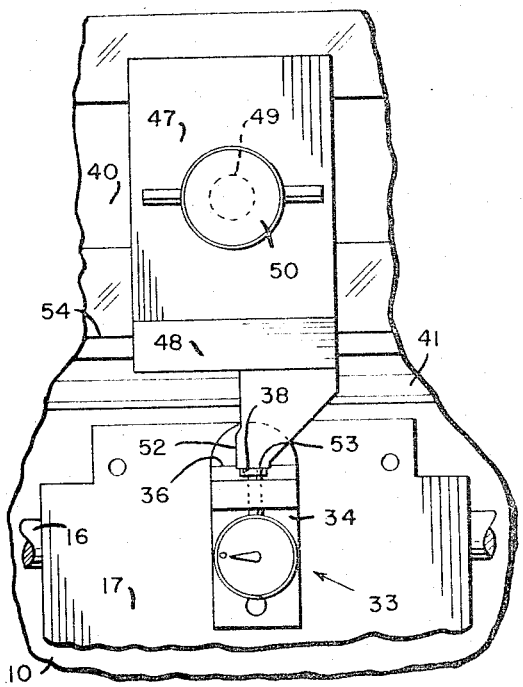
Figure 7:
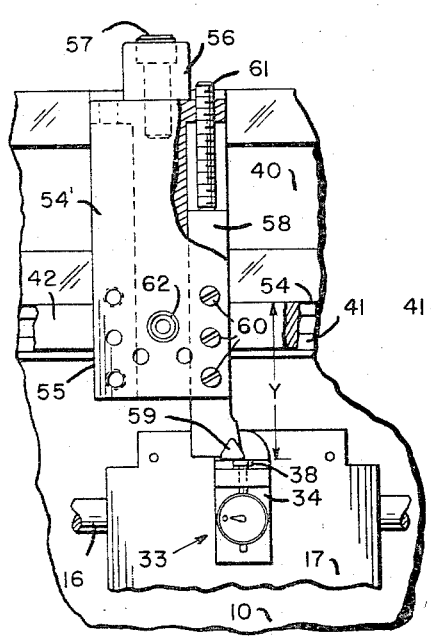
Figure 8:
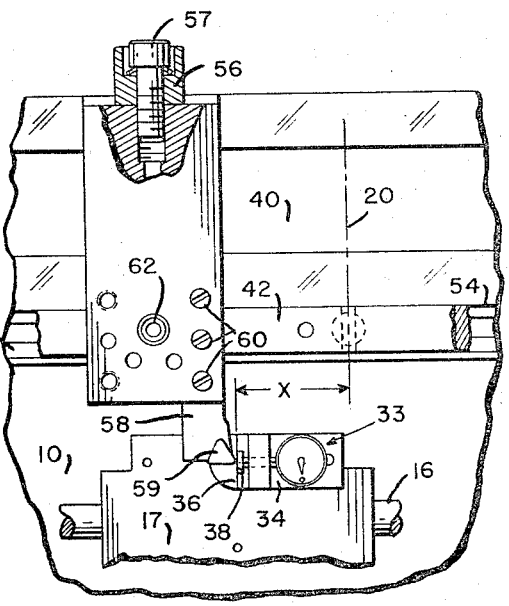
Figure 9:
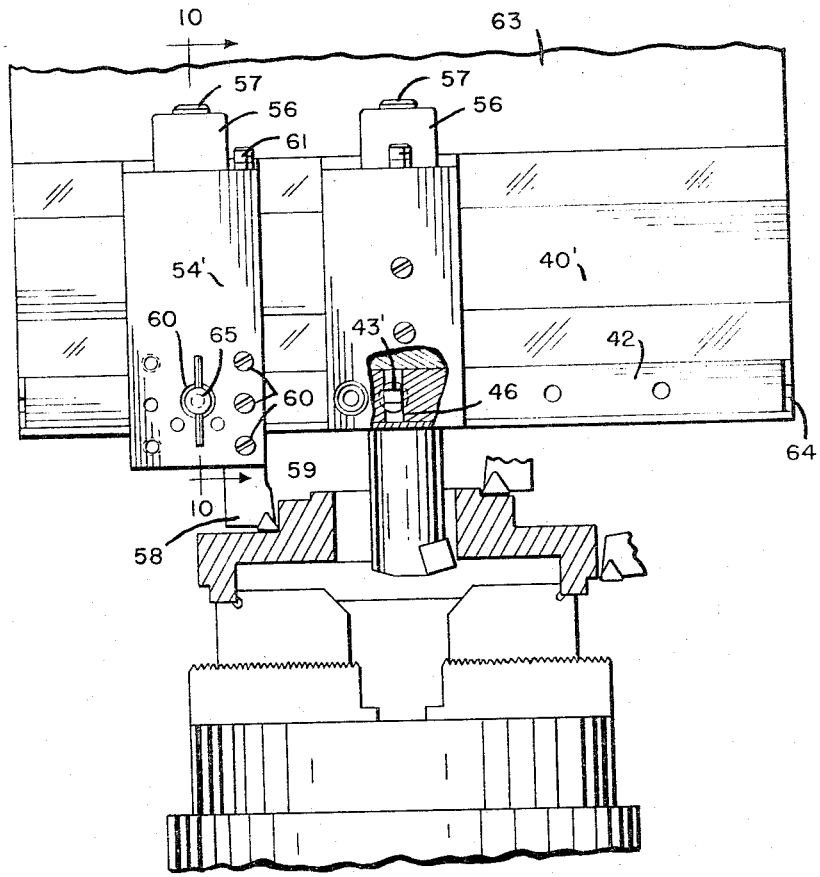
Figure 10:
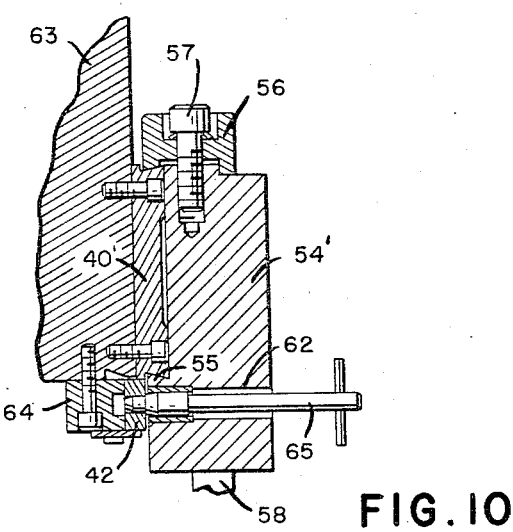

In the drawings:
FIG. 1 is a plan view of a presetting fixture to which the principles of the invention have been applied;
FIG. 2 is a sectional elevation view taken substantially along line 2—2 of FIG. 1;
FIG. 3 is a view along line 3—3 of FIG. 1;
FIG. 4 is a perspective view of the master bar;
FIGS. 5 and 6 are plan views showing a detail of the invention;
FIGS. 7 and 8 are plan views showing tool blocks being preset;
FIG. 9 is a plan view showing tool blocks mounted on the machine tool; and
FIG. 10 is a section taken substantially along line 10—10 of FIG. 9.

Referring to the drawings, and particularly to FIGS. 1 and 3, the principles of the invention are shown as applied to a fixture for presetting tools including a base 10 having cylindrical ways 11 and 12 arranged parallel to each other and along each side of the base 10. Brackets 13 and 14 may be slidingly mounted on ways 11 and 12. Parallel arranged, spaced, cylindrical ways 15 and 16 may be attached to the brackets 13, 14 and a carriage 17 may be slidingly mounted on the ways 15 and 16. Accordingly, carriage 17 can be universally moved in a plane within the confines of base 10.

A scale 18 having a central zero 19 thereon and inch dimensions on each side thereof may be attached to brackets 13, 14. The zero lying along a centerline 20 of base 10 represents the centerline of the work-supporting spindle of the machine tool on which the tool blocks are to be mounted. A pointer 21 may be attached to the center of carriage 17 for cooperation with scale 18.

A thousandths indicator 22 may be attached to a bracket 23 (FIG. 2). A clamping element 24 on bracket 23 is adapted to clamp indicator 22 in position such that a rotatable actuator 25 thereof bears against a flat 26 along way 15. The indicator 22 may include a dial 27, each division of which represents one thousandth of an inch of movement of carriage 17, and another dial 28, each division of which represents one tenth of an inch. Accordingly, movement of carriage 17 along ways 15, 16 can be accurately indicated on indicator 22 to within one thousandth of an inch.

Another indicator 29, identical with indicator 22, is mounted on the bracket 13 so that its rotatable operating wheel can be moved into and out of frictional engagement with a flat on way 11 by a bracket 30 in the same way that bracket 23 is employed. The indicator 29 includes a one-thousandth inch dial 31 and a one-tenth inch dial 32.

In order to indicate to within one ten-thousandths of an inch, an indicator 33 is mounted on a bracket 34 that includes a cylindrical portion 35 (FIG. 2) journaled in the carriage 17. The bracket 34 includes a surface 36 that includes the centerline of the portion 35 and passes through the centerline 20 of base 10. This relationship is retained for any pivotal position of bracket 34. A spring-pressed detent 37 is employed to hold bracket 34 in the position shown in FIG. 1 as well as in positions at 90° on each side thereof. A finger 38 of indicator 33 includes a contacting surface 39 slightly beyond the surface 36.

Base 10 supports a dovetail plate 40 which has the exact cross section of the slide of the machine tool to which the preset tools are to be mounted. Along one edge of plate 40, a channel member 41 is located for supporting a master bar 42 shown in FIG. 4. Centrally of channel 41 is a bifurcated locator 43 adapted to cooperate with a notch 46 on bar 42. There is a similar channel member on the machine tool and an identical locator. The locator 43 is fixed to channel member 41 so that its locating surfaces 44 and 45 are exactly equidistant on each side of the centerline 20. Likewise, the identical locator on the machine tool is mounted in the same way relative to the centerline of the spindle.

Prior to presetting tools on the base 10, it is necessary to establish a zero position on the centerline of base 10 from which horizontal measurements are made, and a corresponding zero position from which vertical measurements are made. To accomplish this, a zero-zero block 47 (FIG. 5) is provided which comprises a single dovetail portion 48 that fits the lower dovetail portion of plate 40, and a hole 49 through which a key 50 fits that is inserted in a hole 51 (FIG. 1) located along the centerline 20. The block 47 also includes a surface 52 that lies along centerline 20 when key 50 is in place. Block 47 also includes a surface 53 that is an arbitrary, predetermined distance (2.000 inches in the embodiment shown) from a "slide line" 54 that is the edge of the lower dovetail portion of plate 40.

With block 47 in place, and with indicator 33 pivoted to the position shown in FIG. 5, carriage 17 is moved toward block 47 until surface 52 contacts surface 36, which forces finger 38 inwardly so that the pointer of indicator 33 registers some value other than zero. The indicator 33 is then set at zero. Dials 27 and 28 are then set to zero, and pointer 21 is at zero.

Subsequently, carriage 17 is moved away from block 47, and indicator 33 is pivoted to the position shown in FIG. 6, after which carriage 17 is moved toward block 47 until finger 38 contacts surface 53 on block 47 and until the pointer of the dial of indicator 33 reads zero. Since the distance from "slide line" datum 54 to surface 52 is 2.000 inches, the dial 32 of indicator 29 is set at 2.000 inches and dial 31 is set at zero.

The presetting fixture is now in condition to preset tools thereon. Referring to FIG. 7, a tool block 54' may include a lower, fixed, dovetail portion 55 (FIG. 10) and a removable dovetail element 56, the latter held to the upper dovetail of the plate 40 by a screw 57. Block 54' supports a cutting tool 58 shown as having a "throwaway" bit 59 and held in adjusted position relative to block 54' by screws 60. An adjusting set screw 61 is employed to provide fine adjustment of tool 58.

The carriage 17 is positioned along the base 10 at a location such that dials 31 and 32 indicate the desired distance "Y" to within next to the least significant digit. Tool 58 is then adjusted by screw 61 until dial 33 reads the least significant digit, after which screw 57 is tightened to rigidly clamp block 54' to plate 40. Thereafter a check is made by sliding carriage 17 away from, and back into the position shown in FIG. 7 to make certain that the setting remains after tightening screw 57.

Screw 57 is then loosened and dial 33 is pivoted to the position shown in FIG. 8. Carriage 17 is moved along base 10 until pointer 21 indicates the desired inch of dimension X, and indicator dial 27 indicates the next to the least significant digit. Block 54' is then moved along plate 40 until the dial 33 reads the least significant digit, after which the screw 57 is tightened and the setting checked as before.

Each block 54' includes a hole 62 that lies within the confines of the master bar 42. When block 54' has been preset as described, a drill is passed through hole 62, drilling a hole in bar 42.

The above procedure is followed for all other tools to be employed on the particular machine tool slide, resulting in a master bar 42 having holes therethrough at preset intervals. Each hole in the master bar is provided with an index identifying it with its corresponding tool block.

Referring to FIGS. 9 and 10, slide 63 has fixed thereto a dovetail plate 40' identical to plate 40 on base 10. A channel-shaped member 64 is fixed to slide 63 in the same positional relationship to plate 40' as that of channel member 41 relative to plate 40 (FIG. 2). Additionally, channel member 64 includes a bifurcated locator 43' along the centerline of the machine tool spindle, precisely as locator 43 is disposed along centerline 20.

The drilled bar 42 is mounted within channel member 64 exactly as it was located in channel member 41. The tool block 54' is mounted on plate 40' and is slid therealong until a key 65 extending through hole 62 registers with the hole in bar 42 that corresponds to block 54', after which screw 57 is tightened and key 65 removed. All other blocks are similarly attached to plate 40', after which the slide is in condition to be operated to produce the desired machining operation.

Although the various features of the improved method of, and apparatus for presetting tools have been shown and described in detail to fully disclose one embodiment of the invention, it will be evident that changes may be made in such details and certain features may be used without others without departing from the principles of the invention.

What is claimed is:

1. Apparatus for presetting tools mounted in tool blocks comprising in combination, a base; a carriage mounted on said base for universal movement within a plane; tool block supporting means on said base, said supporting means being identical to that employed in the machine tool for which the tools are to be preset; at least one tool block mountable on said supporting means; means for supporting a master bar in parallel relation to said tool block supporting means; means for locating said master bar on said base relative to datum lines corresponding to identical datum lines on said machine tool; indicator means on said carriage for indicating the position of said carriage relative to said datum lines; and locating means within each tool block for facilitating the marking on said master bar of the preset location of said tool block relative to said datum lines.

2. Apparatus for presetting tools mounted in tool blocks comprising in combination, a base; a carriage mounted on said base for universal movement within a plane; tool block supporting means on said base, said supporting means being identical to that employed in the machine tool for which the tools are to be preset; at least one tool block mountable on said supporting means; means for supporting a master bar in parallel relation to said tool block supporting means; means for locating said master bar on said base relative to datum lines corresponding to identical datum lines on said machine tool; indicator means on said carriage for indicating the position of said carriage relative to said datum lines to next to the least significant digit; other indicating means on said carriage for indicating the position of said carriage relative to said tool block to the least significant digit; and locating means within each tool block for facilitating the marking on said master bar of the preset location of said tool block relative to said datum lines.

3. Apparatus for presetting tools mounted in tool blocks comprising in combination, a base; a carriage mounted on said base for universal movement within a plane; tool block supporting means on said base, said supporting means being identical to that employed in the machine tool for which the tools are to be preset; at least one tool block mountable on said supporting means; means for supporting a master bar in parallel relation to said tool block supporting means; means for locating said master bar on said base relative to datum lines corresponding to identical datum lines on said machine tool; indicator means on said carriage for indicating the position of said carriage relative to said datum lines to next to the least significant digit; other indicating means on said carriage for indicating the position of said carriage relative to said tool block to the least significant digit, said other indicating means being pivotally mounted so that it is effective in two right angular directions; and locating means within each tool block for facilitating the marking on said master bar of the preset location of said tool block relative to said datum lines.

4. Apparatus for presetting tools mounted in tool blocks comprising in combination, a base; a carriage mounted on said base for universal movement within a plane; tool block supporting means on said base, said supporting means being identical to that employed in the machine tool for which the tools are to be preset; at least one tool block mountable on said supporting means; means for supporting a master bar in parallel relation to said tool block supporting means; means for locating said master bar on said base relative to datum lines corresponding to identical datum lines on said machine tool; indicator means on said carriage for indicating the position of said carriage relative to said datum lines to next to the least significant digit; other indicating means on said carriage for indicating the position of said carriage relative to said tool block to the least significant digit; locating means within each tool block for facilitating the marking on said master bar of the preset location of said tool block relative to said datum lines; and means adapted to be mounted on said base including datum surfaces at right angles to each other for setting said carriage at predetermined initial positions from which all measurements are made.

5. A method for mounting on a machine tool slide a tool block having an adjustably positionable cutting edge with the cutting edge in a preset location relative to longitudinal and transverse datum lines of the machine tool slide, comprising the steps of removably positioning on a gauge base a master bar having reference axes, said reference axes being disposed in predetermined locations relative to longitudinal and transverse datum lines of said base; supporting a tool block on said base; positioning a cutting edge of said tool block in a predetermined location relative to the datum lines of said base; forming an aligned hole extending through said tool block and into said master bar; removing said tool block and said master bar from said gauge base; fixedly positioning said master bar on a machine tool slide having longitudinal and transverse datum lines with the reference axes of said master bar being identically located relative to said machine tool slide datum lines as said predetermined locations of said reference axes with relation to corresponding datum lines of said gauge base; loosely mounting said tool block on said machine tool slide; aligning said hole extending through said tool block and into said master bar; and maintaining said alignment while securely clamping said tool block to said machine tool slide.

6. The method set forth in claim 5 wherein said aligned hole is formed by predrilling a reference hole in said tool block in a predetermined position whereby said hole is disposed adjacent said master bar when said tool block is supported on said gauge base; guiding a drill in said reference hole; and passing said drill into said master bar.

7. The method set forth in claim 5 wherein a plurality of tool blocks are mounted on said tool slide in spaced relation along a reference axis of said master bar.

No references cited.

LEONARD FORMAN, *Primary Examiner.*